United States Patent
Jo (10) Patent No.: US 11,048,872 B2
(45) Date of Patent: Jun. 29, 2021

(54) METHOD OF DETERMINING WORD SIMILARITY

(71) Applicant: LG ELECTRONICS INC., Seoul (KR)

(72) Inventor: Hwiyeol Jo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 158 days.

(21) Appl. No.: 16/557,710

(22) Filed: Aug. 30, 2019

(65) Prior Publication Data

US 2019/0384819 A1   Dec. 19, 2019

Related U.S. Application Data

(63) Continuation of application No. PCT/KR2019/004645, filed on Apr. 17, 2019.

(51) Int. Cl.
*G06F 40/00* (2020.01)
*G06F 40/247* (2020.01)
(Continued)

(52) U.S. Cl.
CPC ............ *G06F 40/247* (2020.01); *G06F 17/16* (2013.01); *G06F 40/216* (2020.01)

(58) Field of Classification Search
CPC ........ G06N 3/0454; G06N 3/08; G06N 20/00; G06N 3/0481; G06N 20/10; G06N 3/02;
(Continued)

(56) References Cited

U.S. PATENT DOCUMENTS 5,325,298 A * 6/1994 Gallant ................. G06F 16/355
704/9
8,174,579 B2 * 5/2012 Inoue ................... G11B 27/105
348/157
(Continued)

FOREIGN PATENT DOCUMENTS

CN     106599029     4/2017
JP     2017142746    8/2017

OTHER PUBLICATIONS

L. Liu, M. Zhong and R. Lu, "Measuring Word Similarity Based on Pattern Vector Space Model," 2009 International Conference on Artificial Intelligence and Computational Intelligence, Shanghai, China, 2009, pp. 72-76. (Year: 2009).*
(Continued)

*Primary Examiner* — Edgar X Guerra-Erazo
(74) *Attorney, Agent, or Firm* — Lee, Hong, Degerman, Kang & Waimey PC (57) ABSTRACT

The present disclosure provides a word vector correction method using artificial intelligence technology. According to the present invention, a method of determining a word similarity for a specific document matrix including a plurality of N word vectors having M dimensions includes decomposing the specific document matrix into a word matrix represented in a D-dimensional word space using a D-dimensional weight matrix; calculating a similarity between the plurality of D-dimensional word vectors included in the word matrix obtained through the decomposition; and determining that words corresponding to word vectors satisfying a preset reference similarity value are similar to each other when the calculated similarity value satisfies the preset reference similarity value.

8 Claims, 6 Drawing Sheets

(51) Int. Cl.
*G06F 17/16* (2006.01)
*G06F 40/216* (2020.01)

(58) Field of Classification Search
CPC ...... G06F 40/30; G06F 16/3347; G06F 17/16; G06F 16/3344; G06F 16/35; G06F 16/313; G06F 16/285; G06F 40/20; G06F 40/177; G06F 40/10; G06F 40/00; G06F 40/237; G06F 40/242; G06F 40/247; G06F 40/211; G06F 40/205; G06F 40/166; G06F 40/183
See application file for complete search history.

(56) References Cited

U.S. PATENT DOCUMENTS

| | | |
|---|---|---|
| 2006/0259481 A1 | 11/2006 | Handley |
| 2009/0028455 A1 | 1/2009 | Nakamura et al. |
| 2009/0204605 A1* | 8/2009 | Bai ..................... G06F 16/3329 |
| 2010/0198839 A1 | 8/2010 | Basu et al. |
| 2010/0228693 A1* | 9/2010 | Dawson ................ G06F 16/322 706/12 |
| 2011/0008020 A1* | 1/2011 | Inoue ................... G11B 27/105 386/296 |
| 2012/0330955 A1* | 12/2012 | Miura ................. G06F 16/3347 707/737 |
| 2013/0013612 A1* | 1/2013 | Fittges .................. G06F 16/353 707/739 |

OTHER PUBLICATIONS

PCT International Application No. PCT/KR2019/004645, Notification of Transmittal of the International Search Report and the Written Opinion of the International Searching Authority, or Declaration dated Jan. 17, 2020, 9 pages.

* cited by examiner

| N×M | = | N×D | × | D×D | × | D×M |

METHOD OF DETERMINING WORD SIMILARITY

CROSS-REFERENCE TO RELATED APPLICATION

Pursuant to 35 U.S.C. § 119, this application claims the benefit of earlier filing date and right of priority to International Application No. PCT/KR2019/004645, filed on Apr. 17, 2019, the contents of which is incorporated by reference herein in its entirety.

BACKGROUND OF THE INVENTION

1. Field of the Invention

The present invention relates to a method of determining a word similarity.

2. Background of the Invention

Along with the development of artificial intelligence technology, the need for natural language processing is increasing day by day. A natural language refers to any language that humans use in everyday life, and natural language processing refers to analyzing the meaning of a natural language to enable a computer to process the natural language.

One major issue of this natural language processing is to check similarities of words or documents, and the similarities can be calculated by digitizing the words or documents using a term-document matrix (TDM), Word2Vec, and the like and then calculating the similarities using the Euclidean distance, cosine similarity, or the like.

For example, a representation obtained by digitizing a word using a vector may be called a word vector, and such a word vector occupies any space in a vector space. Words are located close to or far from one another in the vector space depending on the similarity. In this case, similar words are located closer to each other. Meanwhile, word similarities may be determined based on preset information such as Glove.

SUMMARY OF THE INVENTION

The present invention is directed to providing a word similarity determination method capable of determining whether words are similar to each other even when there is no information regarding similarity or non-similarity between the words.

To achieve these and other advantages and in accordance with the purpose of this specification, as embodied and broadly described herein, there is provided a method of determining a word similarity for a specific document matrix including a plurality of N word vectors having M dimensions, the method including decomposing the specific document matrix into a word matrix represented in a D-dimensional word space using a D-dimensional weight matrix; calculating a similarity between the plurality of D-dimensional word vectors included in the word matrix obtained through the decomposition; and determining that words corresponding to word vectors satisfying a preset reference similarity value are similar to each other when the calculated similarity value satisfies the preset reference similarity value.

In an embodiment, the decomposing of the specific document matrix into the word matrix may include decomposing the specific document matrix into a D-dimensional word matrix and an M-dimensional word matrix using the D-directional weight matrix.

In an embodiment, the specific document matrix may include N word vectors having M dimensions, and each of the N word vectors included in the specific document matrix may be converted into a D-dimensional word vector.

In an embodiment, the word matrix obtained through the decomposition may include N word vectors having D dimensions.

In an embodiment, the calculating of the similarity may include performing cosine similarity computation between the plurality of D-directional word vectors to calculate a similarity value between the plurality of D-dimensional word vectors.

In an embodiment, the calculating of the similarity may include performing cosine similarity computation between the first and second word vectors included in the plurality of D-directional word vectors to calculate a similarity value between the first and second word vectors.

In an embodiment, when a result of the calculation is that the similarity value between the first and second word vectors satisfies the preset reference similarity value, it may be determined that a first word corresponding to the first word vector and a second word corresponding to the second word vector are similar to each other.

In an embodiment, when a result of the calculation is that the similarity value between the first and second word vectors does not satisfy the preset reference similarity value, it may be determined that the first word corresponding to the first word vector and the second word corresponding to the second word vector are not similar to each other.

In an embodiment, the D-dimensional weight matrix may be a diagonal matrix.

In an embodiment, entries in a main diagonal of the weight matrix may have values varying depending on a dimension number of D dimensions.

ADVANTAGEOUS EFFECTS OF THE INVENTION

As described above, according to the present invention, by correcting the dimensions of the word vectors and additionally including information regarding similarities between words corresponding to the word vectors, it is possible to assign similarity information to words that do not have had similarity presence information. Accordingly, according to the present invention, it is possible to perform natural language processing even when a language does not have similarity presence information.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

First, natural language processing (NLP) is a technology that enables a computer to understand and analyze a human language, and is the most important technology for implementing artificial intelligence.

Natural language processing is to express a word in a computer-executable numerical form so that the computer can recognize the meaning of the word. A representative method for the natural language processing is a word embedding model that changes a word to a vector. Word2vec As is an example of the word embedding model.

Meanwhile, a word may be expressed as a vector through the word embedding model, and this vector is called a "word vector" herein. A word expressed as a vector has specific coordinates corresponding to the vector in the vector space.

Words in the vector space are located close to or far from each other depending on similarity or non-similarity between the words.

For example, within the vector space, the distance between the word "animal" and the word "plant" may be farther than the distance between the word "animal" and the word "lion."

In this way, words are expressed as separate vectors. By using the words expressed as the vectors in the natural language processing, the meanings of a word and a sentence composed of words are recognized and understood.

As described above, the performance of the natural language processing can be further improved if a vector of a word can more accurately indicate a degree of similarity of the word.

Figure 1:
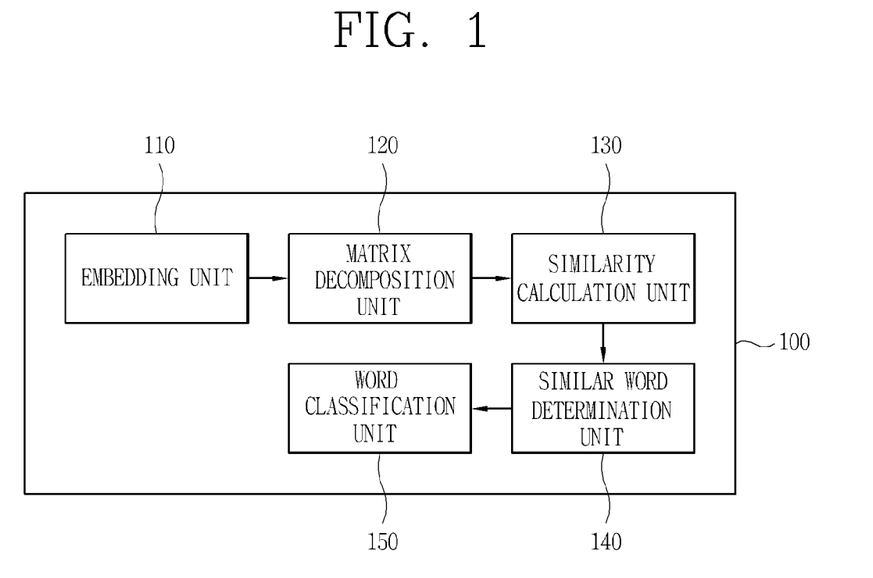
FIG. 1 is a block diagram illustrating a word similarity determination method according to the present invention.
Figure 2:
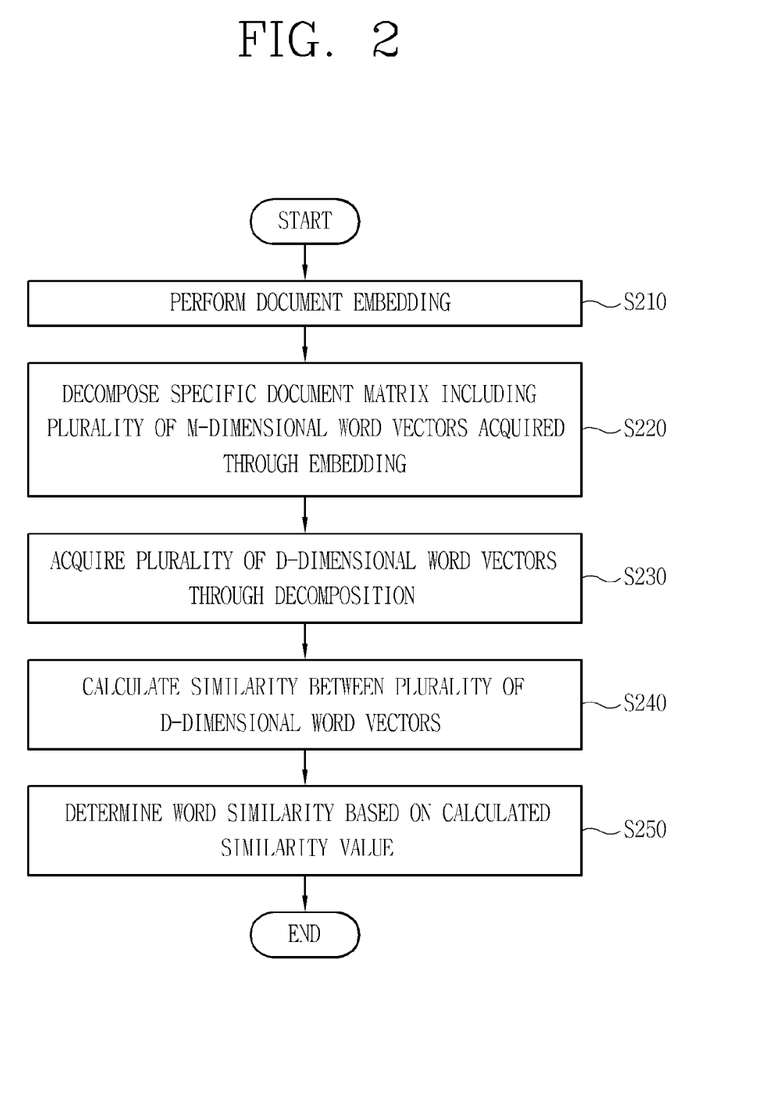
FIG. 2 is a flowchart illustrating a word similarity determination method according to the present invention.

On the other hand, there are cases where similarity information does not exist for specific words, and in these cases, natural word processing may be impossible or inaccurate for the words for which similarity information does not exist. Accordingly, the present invention proposes a method of reflecting similarity information for words included in a document matrix (or a specific document matrix) consisting of a plurality of word vectors. The word similarity determination method capable of reflecting similarity information for words included in a document matrix will be described in more detail below with reference to the accompanying drawings. FIG. 1 is a block diagram illustrating a word similarity determination method according to the present invention, and FIG. 2 is a flowchart illustrating a word similarity determination method according to the present invention.

Figure 3:
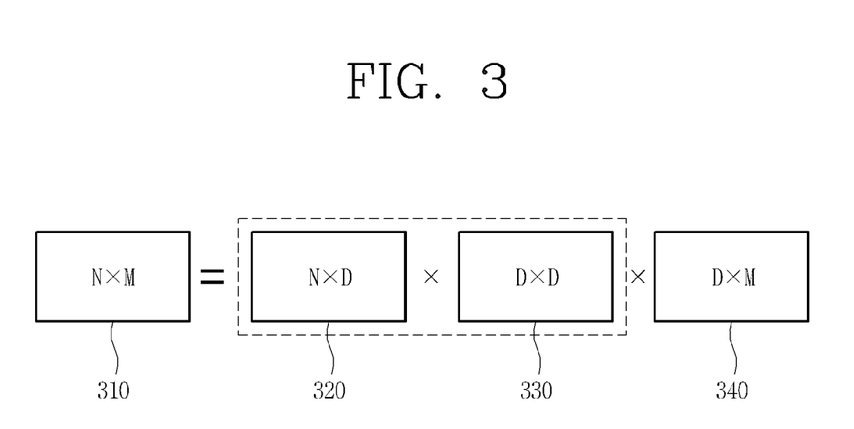
FIGS. 3 and 4 are conceptual views illustrating a method of decomposing a specific document metric according to the present invention.
Figure 4:
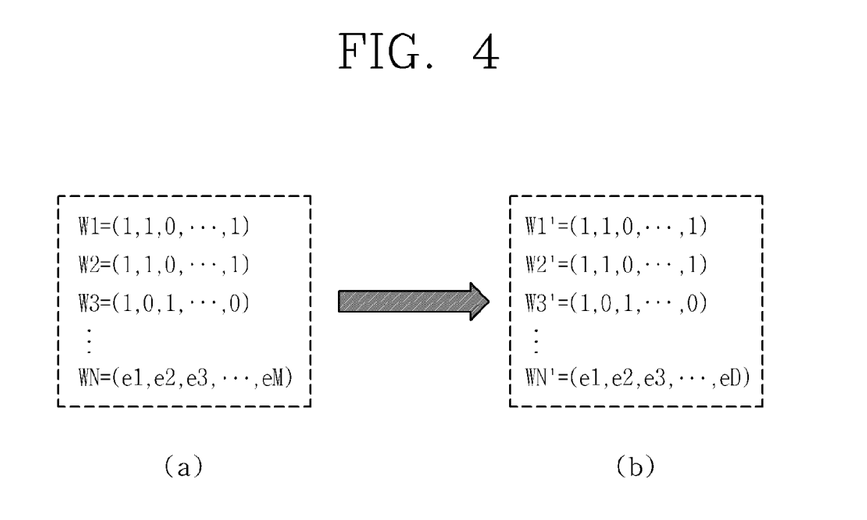
Figure 5:
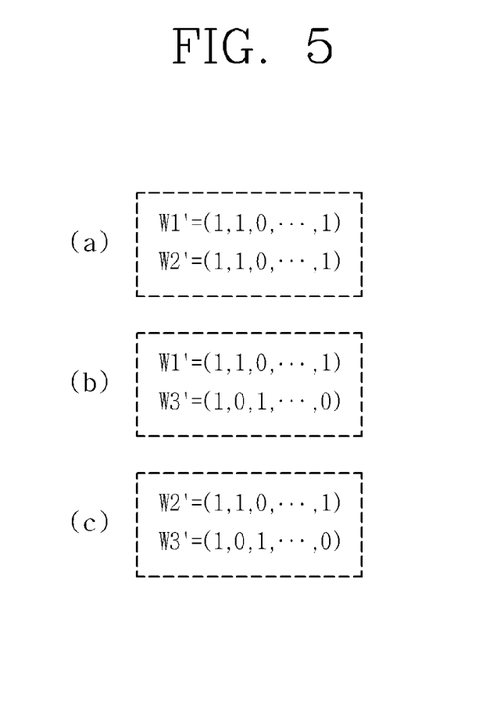
FIGS. 5 and 6 are conceptual views illustrating a method of performing cosine similarity computation between word vectors according to the present invention.
Figure 6:
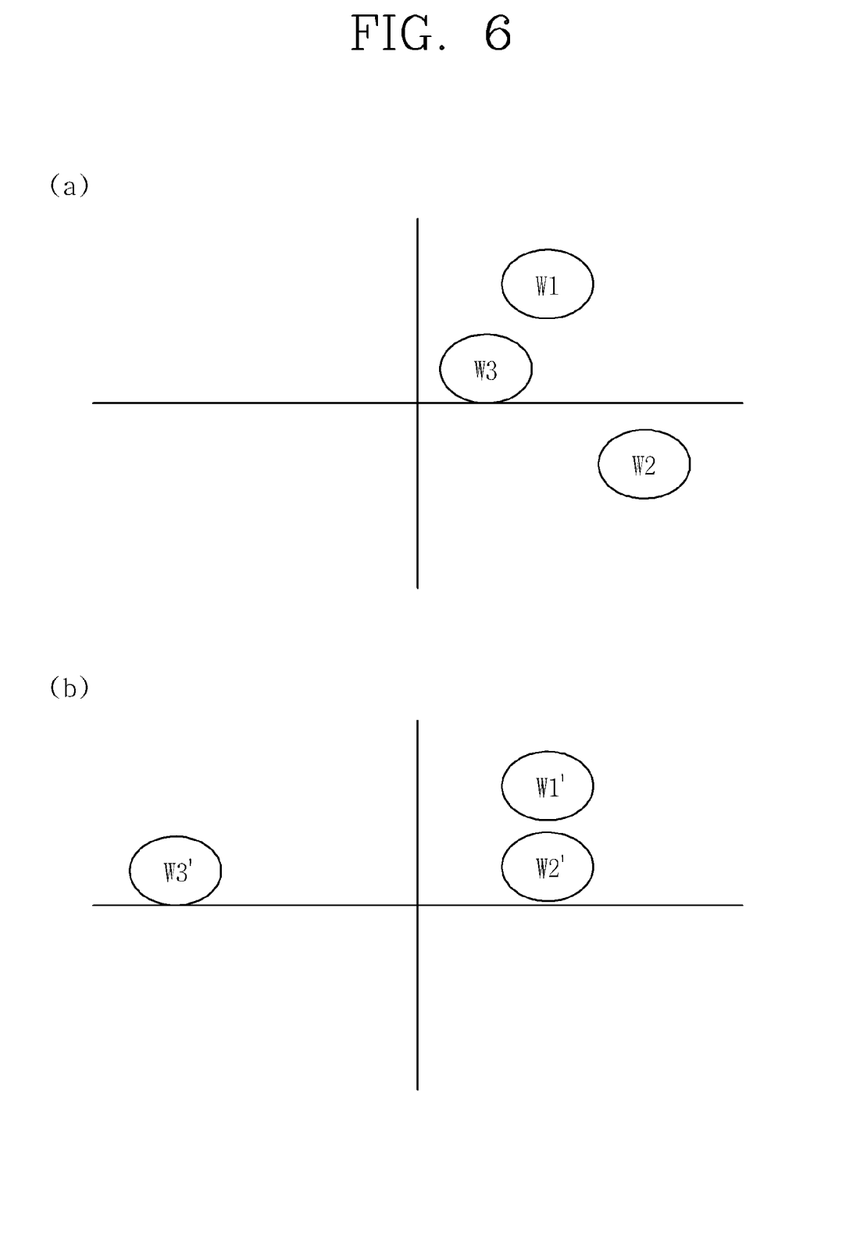
Figure 7:
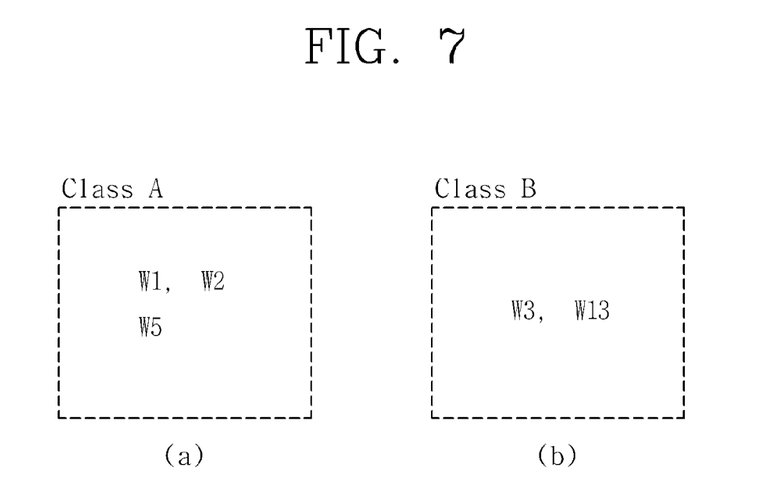
FIG. 7 is a conceptual view illustrating a result of performing word similarity determination according to the present invention.

FIGS. 3 and 4 are conceptual views illustrating a method of decomposing a specific document metric according to the present invention, and FIGS. 5 and 6 are conceptual views illustrating a method of performing cosine similarity computation between word vectors according to the present invention. Furthermore, FIG. 7 is a conceptual view illustrating a result of performing word similarity determination according to the present invention.

First, as shown in FIG. 1, a word similarity determination system 100 for performing a word vector correction method according to the present invention may include at least one of an embedding unit 110, a matrix decomposition unit 120, a similarity calculation unit 130, a similar word determination unit 140, and a word classification unit 150.

Here, the embedding unit 110 may be called a "word vector embedding unit" and is configured to digitize a word to create a word vector.

The matrix decomposition unit 120 is configured to decompose a specific document matrix, and the similarity calculation unit 130 is configured to calculate similarities of word vectors included in a word matrix included in the decomposed specific document matrix.

Also, the similar word determination unit 140 determines whether words are similar to each other using the similarity result calculated by the similarity result calculated by the similarity calculation unit 130.

The word classification unit 150 serves to organize or sort words determined as being similar to one another into the same category or class.

The word similarity determination method will be described in more detail below with reference to the system and the flowchart that have been shown above.

The word similarity determination method according to the present invention includes performing document embedding (S210).

In the performing of the document embedding, the embedding unit 110 digitizes words included in any document to create word vectors having different vector coordinates.

As described above, the embedding unit 110 may represent a word included in a document using a word vector. Meanwhile, a set of such word vectors may be called a "document matrix."

That is, by converting words included in a document into word vectors, the embedding unit 110 may form a specific document matrix.

The specific document matrix may be represented using an N×M matrix and is composed of N word vectors having M dimensions.

The dimension of the word vector created by the embedding unit 110 may correspond to the number of elements included in the word vector. For example, a word vector composed of ten elements may be expressed as a "ten-dimensional word vector."

According to the present invention, the dimension of the word vector is not specifically limited, but is arbitrarily named "n-dimensions."

The word vector correction method according to the present invention is not limited to the number of dimensions of the word vector, but can be applied to all of the dimensions in common.

Next, a process of decomposing a specific document matrix including a plurality of M-dimensional word vectors acquired through the embedding result (S220).

The matrix decomposition unit 120 decomposes the above-described N×M specific document matrix into a D-dimensional word matrix using a D-dimensional weight. That is, the matrix decomposition unit 120 decomposes the specific document matrix into a word matrix represented in a D-dimensional word space.

In more detail, the matrix decomposition unit 120 decomposes the above-described specific initial document matrix into a D-dimensional word matrix and an M-dimensional document matrix using a D-dimensional weight matrix.

As described above, the specific document matrix includes N word vectors having M dimensions. Through the decomposition, each of the N word vectors included in the specific document matrix is converted into a D-dimensional word vector. That is, the word matrix obtained through the decomposition includes N word vectors having D dimensions.

For example, as shown in FIG. 3D, a N×M specific document matrix 310 is decomposed into an N×D word matrix 320 and a D×M document matrix 340 by a D×D D-directional weight matrix 330.

Here, the D×D weight matrix is a diagonal matrix with D rows and D columns and thus has entries only in the main diagonal. The entries in the main diagonal of the weight matrix 330 have values varying depending on a dimension number of D dimensions.

Here, the entries in the main diagonal of the weight matrix 330 are determined according to a result of computation by a matrix decomposition algorithm.

According to the present invention, D dimensions are smaller than M dimensions. For example, when M dimensions are ten dimensions, D dimensions may be nine dimensions. As described above, according to the present invention, a word similarity is determined using a weight matrix having a smaller number of dimensions than those of the specific document matrix.

Accordingly, as shown in FIG. 4A, N M-dimensional word vectors WN are converted into N D-dimensional word vectors WN'.

As described above, through the decomposition, a plurality of D-dimensional word vectors WN' are acquired (S230).

Next, a process of calculating a similarity between the D-dimensional word vectors WN' acquired through the decomposition is performed (S240).

In more detail, the similarity calculation unit 130 performs cosine similarity computation between the plurality of D-dimensional word vectors WN' and calculates a similarity value between the plurality of D-dimensional word vectors WN'.

As shown in FIG. 4B and FIG. 5, the D-dimensional word matrix obtained through the decomposition includes N word vectors WN', and the similarity calculation unit 130 pairs the N word vectors WN' and then calculates cosine similarity values.

The similarity calculation unit 130 performs the cosine similarity computation multiple times to allow the cosine similarity computation to be performed between any one word vector included in the D-dimensional word matrix obtained through the decomposition and all the other word vectors included in the D-dimensional word matrix.

For example, when the D-dimensional word matrix has first to third word vectors W1', W2', and W3', the similarity calculation unit 130 performs cosine similarity between the first and second word vectors W1' and W2' included in a plurality of D-dimensional word vectors WN' to calculates a similarity value between the first and second word vectors W1' and W2', as shown in FIG. 5A. Also, the similarity calculation unit 130 performs cosine similarity computation between the first and third word vectors W1' and W3' to calculate a similarity value between the first and third word vectors W1' and W3', as shown in FIG. 5B. Likewise, the similarity calculation unit 130 performs cosine similarity computation between the second and third word vectors W2' and W3' and calculates a similarity value between the second and third word vectors W2' and W3', as shown in FIG. 5B.

As described above, the similarity calculation unit 130 performs cosine similarity computation multiple times such that the cosine similarity computation is performed between all the word vectors included in the D-dimensional word matrix.

Meanwhile, when the calculation of the similarity values between the plurality of word vectors WN' is complete (S240), a process of determining a word similarity is performed based on the calculated similarity values (S250).

The similar word determination unit 140 determines similar words using the similarity values between the plurality of D-dimensional word vectors WN' that are previously calculated. For example, when the similarity value between the first and second word vectors W1' and W2' that are previously calculated satisfies a preset reference similarity value, the similar word determination unit 140 determines that the first word corresponding to the first word vector W1' and the second word corresponding to the second word vector W2' are similar to each other.

On the contrary, when the similarity value between the first and second word vectors W1' and W2' that are previously calculated does not satisfy the preset reference similarity value, the similar word determination unit 140 determines that the first word corresponding to the first word vector W1' and the second word corresponding to the second word vector W2' are not similar to each other.

For example, the cosine similarity may have a value ranging from −1 to 1. According to the present invention, a specific value may be set between −1 and 1 as the preset reference value. For example, when the preset reference value is 0.9, the similar word determination unit 140 performs cosine similarity computation to determine that words corresponding to word vectors having values of 0.9 or greater are similar to each other.

As described above, according to the present invention, the similar word determination unit 140 decomposes a specific document matrix including a plurality of M-dimensional word vectors into a word matrix having D dimensions lower than M dimensions and performs cosine similarity computation on word vectors included in the D-dimensional word matrix. Also, the similar word determination unit 140 determines a word similarity in a D-dimensional vector space using a result of the cosine similarity computation. When the cosine similarity computation is performed between the D-dimensional word vectors, the similar word determination unit 140 may determine a relative positional relationship between the word vectors in the D-dimensional vector space and then determine that words positioned close to each other are similar to each other.

For example, as shown in FIG. 6A, it is assumed that information regarding similarities between the first to third words corresponding to the first to third M-dimensional word vectors W1, W2, and W3 included in the M-dimensional specific document metric does not exist. In this case, the first to third word vectors W1, W2, and W3 do not have relative position information that may reflect mutual similarities in the M-directional vector space.

In this case, the first to third word vectors W1, W2, and W3 may be disposed at any position in the M-directional vector space regardless of word similarities.

Meanwhile, according to the present invention, when the M-dimensional word vector is converted into D-dimensional word vectors W1', W2, and W3 using a weight matrix, the D-directional word vectors W1', W2, and W3 may have relative position information capable of reflecting the mutual similarities in the D-dimensional vector space.

For example, when the similarity value between the first and second word vectors W1' and W2' satisfies the preset reference similarity value, it is determined that the first word corresponding to the first word vector W1' and the second word corresponding to the second word vector W2' are similar to each other. In this case, as shown in FIG. 6B, the distance between the first and second word vectors W1' and W2' may be smaller in the D-dimensional vector space as shown in FIG. 6B than in the M-dimensional vector space as shown in FIG. 6A.

Also, when the similarity value between the first and third word vectors W1' and W3' does not satisfy the preset reference similarity value, it is determined that the first word corresponding to the first word vector W1' and the third word corresponding to the third word vector W3' are not similar to each other. In this case, as shown in FIG. 6B, the distance between the first and third word vectors W1' and W3' may be greater than the distance between the first and second word vectors W1' and W2' which are similar to each other in the M-dimensional vector space, as shown in FIG. 6B.

As described above, when the determination of similar words is completed, the word classification unit 150 sorts the similar words determined by the similar word determination unit 140. Words having similar meanings may be included in the same class.

For example, as shown in FIG. 7A, the first, second, and fifth words W1, W2, and W5 included in "Class A" may be words having similar meanings (e.g., a tree, a plant, and a flower).

Also, as shown in FIG. 7B, the third and thirteenth words W3 and W13 included in "Class B" may be words having similar meanings (e.g., an animal and a lion).

As described above, according to the present invention, by sorting words having similar meanings, similarity information may be assigned to words that do not have had the similarity information.

As described above, according to the present invention, by correcting the dimensions of the word vectors and additionally including information regarding similarities between words corresponding to the word vectors, it is possible to assign similarity information to words that do not have had similarity presence information. Accordingly, according to the present invention, it is possible to perform natural language processing even when a language does not have similarity presence information.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the processor or the controller. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A method of determining word similarity, the method comprising:
   decomposing a document matrix having N number of word vectors each having M dimensions into at least one decomposed word matrix having D-dimensional word vector representations using a D-dimensional weight matrix;
   calculating a similarity value between each of the plurality of word vectors included in the at least one decomposed word matrix; and
   determining that two word vectors of the at least one decomposed word matrix are similar to each other based on a calculated similarity value between the two word vectors satisfying a preset reference similarity value.

2. The method of claim 1, wherein the at least one decomposed word matrix comprises a D-dimensional word matrix and an M-dimensional word matrix.

3. The method of claim 2, wherein,
   each of the N word vectors included in the document matrix is converted into a D-dimensional word vector.

4. The method of claim 3, wherein the at least one decomposed word matrix obtained through the decomposition includes N word vectors with D dimensions.

5. The method of claim 1, wherein calculating the similarity value comprises performing cosine similarity computation between the two word vectors of the at least one decomposed word matrix.

6. The method of claim 1, further comprising determining that two word vectors of the at least one decomposed word matrix are not similar based on the calculated similarity value between the two word vectors not satisfying the present reference similarity value.

7. The method of claim 1, wherein the D-dimensional weight matrix is a diagonal matrix.

8. The method of claim 7, wherein entries in a main diagonal of the weight matrix have values varying depending on a dimension number of D dimensions.

* * * * *

UNITED STATES PATENT AND TRADEMARK OFFICE
CERTIFICATE OF CORRECTION

| | | |
|---|---|---|
| PATENT NO. | : 11,048,872 B2 | Page 1 of 1 |
| APPLICATION NO. | : 16/557710 | |
| DATED | : June 29, 2021 | |
| INVENTOR(S) | : Hwiyeol Jo | |

It is certified that error appears in the above-identified patent and that said Letters Patent is hereby corrected as shown below:

In the Specification

In Column 1, Line 7 and 8:
Delete "Pursuant to 35 U.S.C. § 119, this application claims the benefit of earlier filing date and right of priority to" and insert --This application is a continuation of--

Signed and Sealed this
First Day of March, 2022

Drew Hirshfeld
*Performing the Functions and Duties of the
Under Secretary of Commerce for Intellectual Property and
Director of the United States Patent and Trademark Office*